(12) United States Patent
Oh et al.

(10) Patent No.: US 6,718,037 B1
(45) Date of Patent: Apr. 6, 2004

(54) COMPUTER WITH A MODEM CAPABLE OF OUTPUTTING TELEPHONE BELL SIGNALS

(75) Inventors: Jin-Uk Oh, Seoul (KR); Kyoung-Won Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 09/306,895

(22) Filed: May 7, 1999

(30) Foreign Application Priority Data

May 8, 1998 (KR) .......................................... 98-16561

(51) Int. Cl.[7] .............................................. H04M 1/00
(52) U.S. Cl. .................................. 379/418; 379/373.02
(58) Field of Search ....................... 379/373.01, 376.01, 379/373.02–373.05, 418, 102.04, 67.01, 93.35; 713/310, 320

(56) References Cited

U.S. PATENT DOCUMENTS

| | | | |
|---|---|---|---|
| 4,471,489 A | | 9/1984 | Konetski et al. |
| 4,578,533 A | | 3/1986 | Pierce |
| 4,578,537 A | | 3/1986 | Faggin et al. |
| 4,656,318 A | * | 4/1987 | Noyes .................... 379/102.04 |
| 5,499,287 A | * | 3/1996 | Campbell et al. ...... 379/373.05 |
| 5,530,558 A | * | 6/1996 | Nachman ..................... 358/442 |
| 5,530,951 A | | 6/1996 | Argintar |
| 5,631,651 A | | 5/1997 | Nichols et al. |
| 5,671,269 A | * | 9/1997 | Egan et al. ................. 379/67.1 |
| 5,673,257 A | | 9/1997 | Sharma et al. |
| 5,675,640 A | * | 10/1997 | Tappert et al. ......... 379/374.01 |
| 5,799,036 A | | 8/1998 | Staples |
| 5,822,406 A | | 10/1998 | Brown |
| 5,903,765 A | * | 5/1999 | White et al. ................. 713/310 |
| 5,949,853 A | * | 9/1999 | Resnick ..................... 379/67.1 |
| 6,243,819 B1 | * | 6/2001 | Jung .......................... 713/320 |

\* cited by examiner

Primary Examiner—Xu Mei
Assistant Examiner—Jefferey Harold
(74) Attorney, Agent, or Firm—Robert E. Bushnell, Esq.

(57) ABSTRACT

A computer having a modem outputs a telephone bell signals regardless of an active state of the computer as well as the modem. The modem provides a voltage signal responsive to the active state thereof. The computer system includes a bell signal generator for producing a bell signal in response to a ring signal received over a telephone line connected to the modem. Further, a relay switch is provided across the telephone line directed to the bell signal generator, the relay switch comprising normal-on switches allowing the telephone line to be connected to the bell signal generator when the modem is inactive state, and being activated to cut off the switch in response to the voltage signal fed from the modem. A speaker is connected to the output of the bell signal generator. If a telephone set is not connected to the modem, the computer of this invention may detect the telephone ring signal and sound a bell signal even if the computer as well as the modem is not in the active state.

20 Claims, 3 Drawing Sheets

COMPUTER WITH A MODEM CAPABLE OF OUTPUTTING TELEPHONE BELL SIGNALS

CLAIM OF PRIORITY

This application makes reference to, incorporates the same herein, and claims all benefits accruing under 35 U.S.C. §119 from an application entitled COMPUTER SYSTEM WITH MODEM earlier filed in the Korean Industrial Property Office on the 8$^{th}$ day of May 1998, and there duly assigned Serial No. 98-16561, a copy of which is annexed hereto.

BACKGROUND OF THE INVENTION

1. Technical Field

The present invention relates to computers, and more particularly to a computer having a modem capable of outputting telephone bell signals regardless of use of the computer.

2. Related Art

Computer systems are information handling systems that are utilized by many individuals and businesses today. A computer system can be defined as a microcomputer that includes a central processing unit (CPU), a volatile memory, a non-volatile memory such as read only memory (ROM), a display monitor, a keyboard, a mouse or other input device such as a trackball, a floppy diskette drive, a compact disc-read only memory (CD-ROM) drive, a modem, a hard disk storage device, and a printer. A computer system's main board, which is a printed circuit board known as a motherboard, is used to electrically connect these components together. A computer system can be a desktop computer, a portable computer such as a notebook computer or palm-sized computer, or other type of computer.

The central processing unit is often described as a microprocessor. The microprocessor is an electronic component having internal logic circuitry handling most, if not all, the data processing in the computer system. The internal logic circuitry of microprocessors is typically divided into three functional parts known as the input/output (I/O) unit, the control unit, and the arithmetic-logic unit (ALU). These three functional parts interact together and determine the power and performance of the microprocessor. The combination of the control unit and the arithmetic-logic unit can be referred to as the central processing unit. Also, the combination of the input/output unit, the control unit, and the arithmetic-logic unit can be referred to as the central processing unit.

One example of a non-volatile memory is a read only memory (ROM). Information stored in the non-volatile memory can remain unchanged even when there is a power failure. The information stored in the non-volatile memory will stay there until it is changed. A read only memory is used to store important information such as instructions for the central processing unit. There are different types of read only memory including an electrically-erasable-programmable-read-only-memory (EEPROM) chip and a flash-read-only-memory (flash-ROM). The flash-ROM can also be referred to as a flash memory.

Computer systems include a basic input output system (BIOS) which is an especially important program stored in read only memory. The basic input output system tests a computer every time the computer is powered on. The basic input output system can allocate a computer system's resources automatically, making adjustments needed to accommodate new hardware. Also, the basic input output system governs how system board components interact.

When the computer system is powered on, the basic input output system immediately takes control of the computer system and its components. The first duty of the basic input output system is to perform a series of diagnostic routines called the power on self test (POST) routine, which ensures that every part of the computer system's hardware is functioning properly.

Computer systems can be equipped with a modem in order to connect to remote computers and exchange files, programs, images, and information across telephone lines. A modem interfaces a computer with a telephone line and thus is called in this art data communication equipment (DCE). The modem has a modulator that converts digital data received from the computer into analog signals to transmit over the telephone lines and a demodulator that converts the analog signals from the telephone network into original digital data.

Further, modems are usually installed inside the personal computer as an internal modem. Expansion cards or PCMCIA type internal modems are popular for their compactness and low price. For connecting with a telephone line, the expansion slot modem has a common modular jack that can be easily plugged into electrical wires of the telephone system. This modem usually has another modular jack for connecting the telephone line optionally to an external telephone set.

A telephone ring signal can be heard through an external telephone set when the external telephone set is connected to a modular jack of the modem. The external telephone set can output the telephone ring signal even when the modem and the computer system are not in an operating state.

However, I have found that when no external telephone set is connected with the modem, and the modem and the computer system are not in an operating state, there will be no audible signal indicating an incoming telephone call. In other words, there will be no way to hear the telephone ring signal and there will be no way to be notified of the incoming telephone call.

Efforts have been made to improve computers, modems, and telephone connections. Exemplars of recent efforts in the art include U.S. Pat. No. 5,822,406 for SWITCHING CIRCUIT FOR AUTOMATICALLY ROUTING AUDIO AND DATA SIGNALS BETWEEN A MODEM, TELEPHONE, AND I/O DEVICES issued to Brown, U.S. Pat. No. 5,799,036 for COMPUTER SYSTEM WHICH PROVIDES ANALOG AUDIO COMMUNICATION BETWEEN A PC CARD AND THE COMPUTER'S SOUND SYSTEM issued to Staples, U.S. Pat. No. 5,673,257 for COMPUTER-BASED MULTIFUNCTION PERSONAL COMMUNICATION SYSTEM issued to Sharma et al, U.S. Pat. No. 5,631,651 for TELECOM ADAPTER FOR INTERFACING COMPUTER DEVICES TO THE ANALOG TELEPHONE NETWORK issued to Nichols et al., U.S. Pat. No. 5,530,951 for TELEPHONE LINE SHARING APPARATUS issued to Argintar, U.S. Pat. No. 4,578,537 for TELECOMMUNICATION APPARATUS SERVING AS AN INTERFACE BETWEEN A DIGITAL COMPUTER AND AN ANALOG COMMUNICATION MEDIUM issued to Faggin et al., U.S. Pat. No. 4,578,533 for SWITCHABLE LINE POWERED MODEM issued to Pierce, and U.S. Pat. No. 4,471,489 for AUTOMATIC ANSWER/ORIGINATE MODE SELECTION IN MODEM issued to Konetski et al.

While these recent efforts provide advantages, I note that they fail to adequately provide a computer with a modem capable of efficiently and conveniently outputting telephone bell signals.

SUMMARY OF THE INVENTION

It is an object of the present invention to provide a computer with a modem having a bell signal generator, provided in the computer to respond to an incoming ring signal received by the modem regardless of operation state of the computer system as well as a terminal emulation program.

It is therefore an object of the present invention to provide a computer which can indicate the telephone ring signal received by the modem regardless of operation of the computer system.

In accordance with the present invention, a computer system comprises; a modem coupled to the computer system and providing a voltage signal responsive to the active state of the modem; means for producing a bell signal in response to the ring signal received over a telephone line connected thereto; a relay switch provided across the telephone line directed to the bell signal producing means, in which the relay switch comprises normal-on switches that allow the telephone line to be connected to the bell signal producing means when the modem is in an inactive state, and being activated to cut off the switch in response to the voltage signal fed from the modem; and a speaker connected to the output of the bell signal producing means.

The bell signal producing means and the relay switch are provided either in the modem or on a main board of the computer system. The computer system according to this invention may detect the telephone ring signal and sound a bell signal even if the computer and the modem are not in the active state.

To achieve these and other objects in accordance with the principles of the present invention, as embodied and broadly described, the present invention provides an apparatus, comprising:

a computer system processing information;

a telephone cable having a first end and a second end, said cable conveying data between said first and second ends, said first end being coupled to a central office;

a modem outputting a voltage signal according to an active state of said modem, said modem being coupled to said computer system and being coupled to said second end of said telephone cable;

a generator coupled to said telephone cable, said generator producing a bell signal in response to a ring signal received from said telephone cable, said ring signal corresponding to an incoming call, said bell signal informing an operator of existence of said incoming call; and a switch coupled across said telephone cable, said switch switching on to connect said telephone cable to said generator when said modem is in an inactive state, said switch switching off to disconnect said telephone cable from said generator when said modem is in an active state, said switch performing said switching on and said switching off in response to said voltage signal received from said modem.

To achieve these and other objects in accordance with the principles of the present invention, as embodied and broadly described, the present invention provides an apparatus, comprising:

a computer system processing user information including varying visual information;

a modem outputting a voltage signal in accordance with an operating state of said modem, said modem being coupled to said computer system and being coupled to a telephone cable;

a generator coupled to said telephone cable, said generator producing a bell signal in response to a ring signal received from said telephone cable, said ring signal corresponding to an incoming call, said bell signal informing an operator of existence of said incoming call; and a switch coupled across said telephone cable, said switch connecting said telephone cable to said generator and not connecting said telephone cable to said generator in response to said voltage signal received from said modem.

To achieve these and other objects in accordance with the principles of the present invention, as embodied and broadly described, the present invention provides an apparatus, comprising:

a modem outputting a voltage signal in accordance with an operating state of said modem, said modem being coupled to a telephone cable;

a generator coupled to said telephone cable, said generator producing a bell signal in response to a ring signal received from said telephone cable, said ring signal corresponding to an incoming telephone call; and a switch coupled across said telephone cable, said switch connecting said telephone cable to said generator enabling said generator to receive said ring signal, and not connecting said telephone cable to said generator in response to said voltage signal received from said modem not enabling said generator to receive said ring signal.

The present invention is more specifically described in the following paragraphs by reference to the drawings attached only by way of example. Other advantages and features will become apparent from the following description and from the claims.

BRIEF DESCRIPTION OF THE DRAWINGS

In the accompanying drawings, which are incorporated in and constitute a part of this specification, embodiments of the invention are illustrated, which, together with a general description of the invention given above, and the detailed description given below, serve to exemplify the principles of this invention.

DETAILED DESCRIPTION OF PREFERRED EMBODIMENTS

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Figure 2:
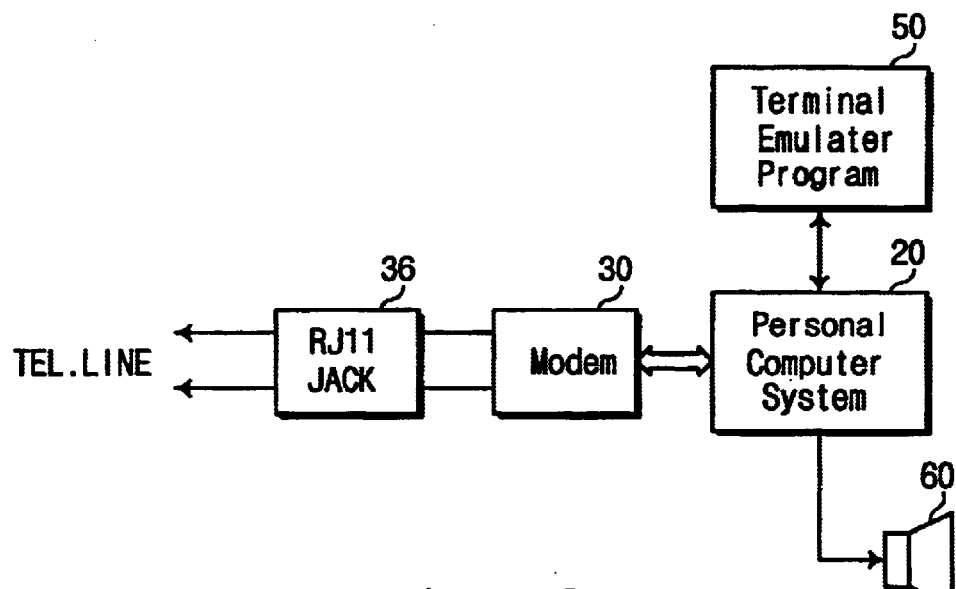
FIG. 2 is a schematic diagram for explaining a telephone bell signal generation operation in a computer system having a modem.

In a modem, an incoming telephone ring signal can be directly received by the modem if a telephone line is connected to a line modular jack of the modem and a terminal emulator program is running in a computer coupled to the modem. As shown in FIG. 2, if a telephone line is connected to the modular jack 36 and a terminal emulator program 50 is running in the a personal computer system 20, the modem 30 detects the ring signal received from the telephone line and a modem ring detect signal is generated therein. The ring detect signal is sent to the terminal emulator program 50, and responsive thereto the emulator program 50 allows the computer system 20 to generate a bell signal. This bell signal is outputted to a PC speaker or external speaker 60. The terminal emulator program 50 is a software program operated in manner in which a terminal is emulated.

A computer system today can be used as a communications device when the computer system is connected to a telephone line via a modem. In other words, when a telephone line is connected to a modem and the modem is then connected to a computer system, a first user can utilize the computer system to place a telephone call to a second user. Presuming that the first user is utilizing a computer system and the second user is utilizing a standard tone telephone set, the telephone call can be placed when the first user enters the second user's telephone number into the computer system of by using the keyboard of the computer system. When the second user answers the call using the standard tone telephone set, the first user can speak into a microphone connected to the computer system so as to talk to the second user, and the first user can listen to a speaker connected to the computer system to hear the second user. Additionally, a computer system can be used to receive a telephone call in a similar manner.

A telephone set in wide use today is known as a standard tone telephone set. The standard tone telephone set is a telephone set which uses a method called a dual tone multifrequency (DTMF) method for sending a telephone number to a central office when placing a telephone call. The term "central office" refers to switching equipment that provides local exchange telephone service for a given geographical area, designated by the first three digits of a seven-digit telephone number in the United States of America. A local network is used to connect telephones in residences and businesses to central offices. Exchange area networks are disposed between local networks and long-distance networks.

The dual tone multifrequency (DTMF) method can only be utilized when the central office is equipped to process the dual tone multifrequency (DTMF) signals. Standard tone telephone sets have been replacing rotary dial telephone sets. Standard tone telephone sets include a push-button keypad for dialing. The push-button keypad has 12 keys, which represent the numbers 0 through 9 and the symbols*and #. Pressing one of these 12 keys causes an electronic circuit to generate two tones, each tone having a different frequency. Hence the name dual tone multifrequency (DTMF).

There is a low frequency tone for each row of keys across the keypad and a high frequency tone for each column of keys down the keypad. Pressing key 7, for example, generates an 852 hertz tone and a 1,209 hertz tone. Pressing key 1, which is in the same column as key 7, generates a 697 hertz tone and the 1,209 hertz tone. Pressing key 9, which is in the same row as key 7, generates the 852 hertz tone and a 1,477 hertz tone. By using the dual tone method, 12 unique combinations are produced from only seven tones when the 12-position keypad is used.

When a computer system including a modem is connected to a telephone line, the computer system can be utilized to place a telephone call if the computer system can cause dual tone multi frequency (DTMF) signals to be transmitted to the telephone line. In this manner, the computer system is simulating the standard tone telephone set, described above, to cause the computer system to act as a communications device.

A first user having a first telephone can communicate with a second user having a second telephone when the first user calls the second user. The first telephone can be connected to the second telephone with an electrical cable conveying electrical signals. Alternatively, the first telephone can be connected to the second telephone with an optical fiber cable conveying light. An additional option is that the first and second telephones are connected to each other with a combination of electrical cables and optical fiber cables.

Figure 1:
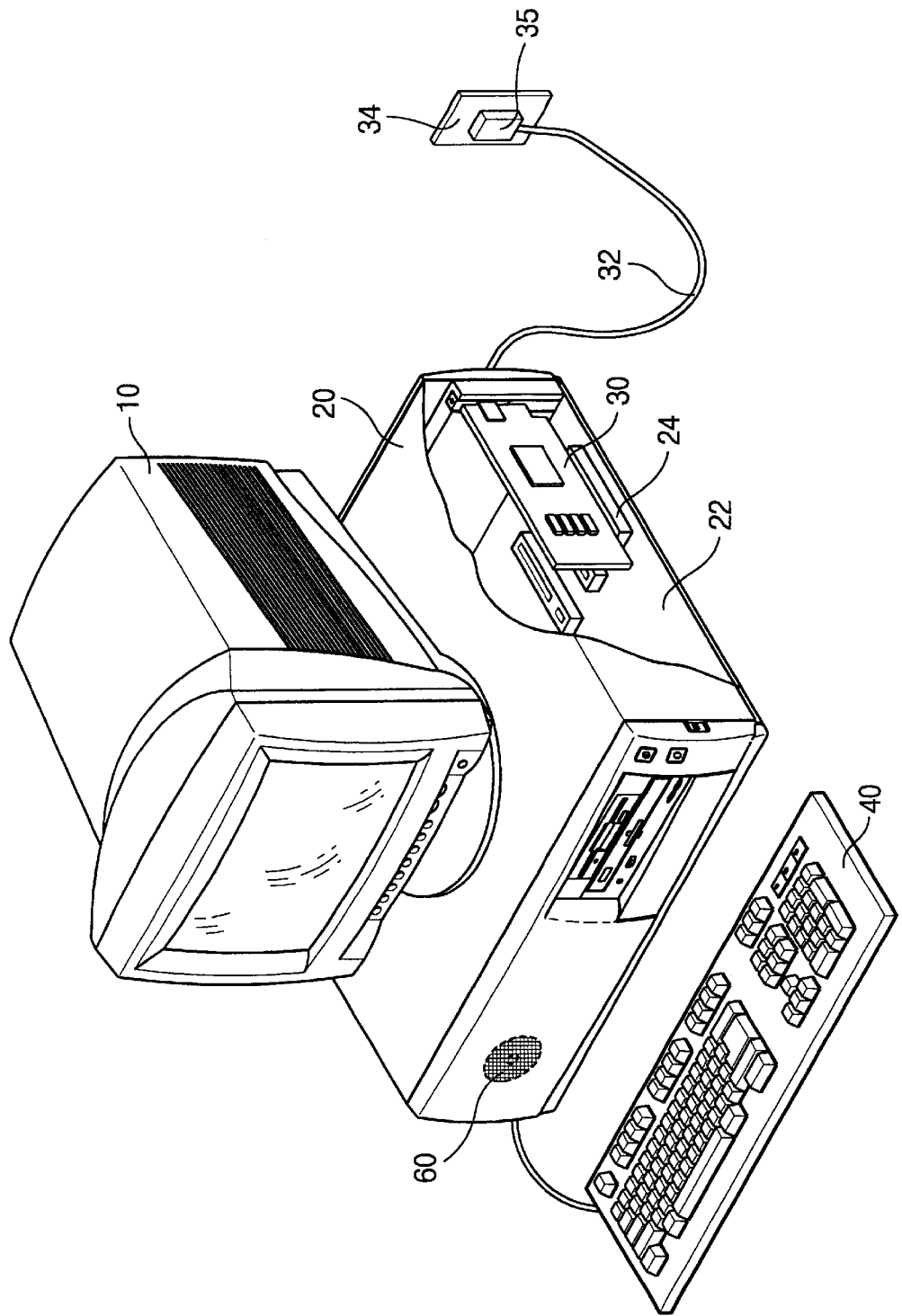
FIG. 1 is a diagram depicting a computer system having an internal modem connected with an analog wall jack, in accordance with the principles of the present invention.

Turn now to FIG. 1, which shows a computer system including a computer main body 20, a monitor 10, and a keyboard 40, in accordance with the principles of the present invention. The computer system further includes an internal modem 30, preferably an expansion card type modem, installed in an expansion slot 24 of a main board 22. This modem 30 is connected with an analog wall jack 34 via an electrical wire 32 and a telephone wall plug 35.

The monitor 10 can be a cathode ray tube (CRT), a liquid crystal display (LCD), a gas-plasma display, a light emitting diode (LED) display, an electro-luminescent display, or a field emission display, or other type of visual display unit conveying varying information to a user.

The computer system of FIG. 1 has a telephone bell signal generator, in accordance with the principles of the present invention. The telephone bell signal generator is provided to detect the ring signal received by the modem 30 and to indicate the telephone ring signal regardless of operation of the computer system.

Figure 3:
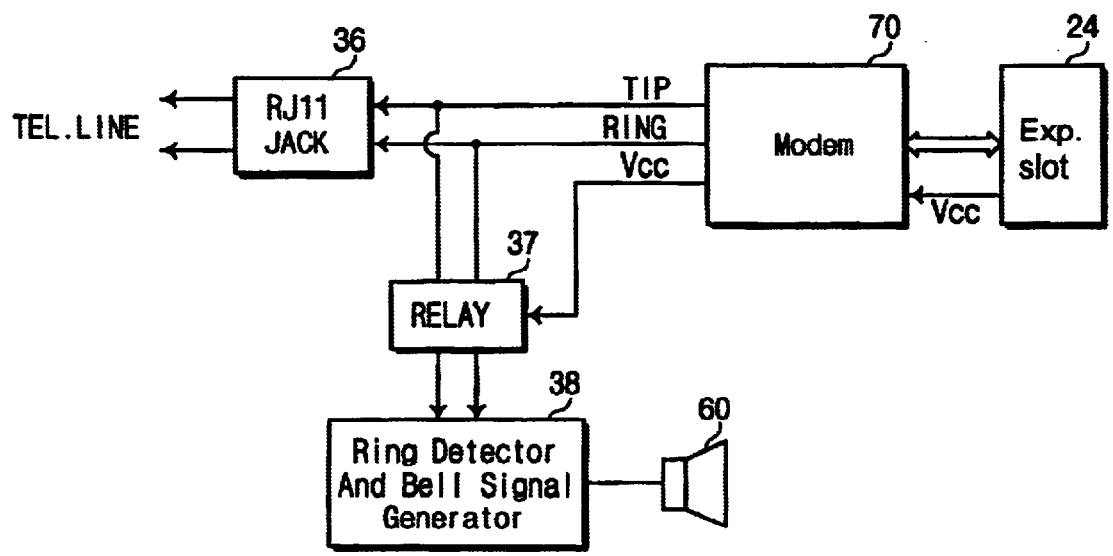
FIG. 3 is a block diagram of the computer system having a telephone bell signal generator, in accordance with the principles of the present invention.

Turn now to FIG. 3, which is a block diagram of the computer system of FIG. 1 having a telephone bell signal generator, in accordance with the principles of the present invention. As shown in FIG; 3, the computer system of FIG. 1 includes a ring signal detector and bell signal generator 38 (hereinafter referred to bell signal generator) connected in parallel with TIP and RING telephone lines directed to the line input of a modem 70. The telephone lines are preferably connected with an analog wall jack through a modular jack 36. A relay switch 37 is connected across the TIP and RING telephone lines between the line input of the modem 70 and the bell signal generator 38. The relay switch 37 consists of a double-pole-double-throw (DPDT) switch with its contacts normally being in a switch-on state. The relay switch 37 is activated to cut off the parallel telephone lines in response to a relay drive voltage $V_{cc}$ supplied by the modem 70. The modem 70 is an expansion card type modem and is coupled to an expansion slot 24 of the computer. An operating voltage $V_{cc}$ is supplied to the modem 70 through the expansion slot 24. Also, data and control signals are transmitted between the modem 70 and the computer system by way of the expansion slot 24. The output terminal of the bell signal generator 38 is connected to a speaker 60. The speaker 60 may be an internal PC (personal computer) speaker.

In operation, when the computer system and modem 70 are in an inactive state, the relay drive voltage $V_{cc}$ is not supplied to the relay switch 37, which allows its switches to maintain a switch-on state. In this case, if a telephone ring signal calling the computer user is inputted through the telephone line, the ring signal cannot be received by the modem 70 since its internal hook switch (not shown) is in the off state and the modem is in the inactive state. The ring signal may be sent to the bell signal generator 38 by way of the relay switch 37 which maintains the switch-on state.

The bell signal generator 38 detects the ring signal received via the relay switch 37 and generates a bell signal capable of driving the speaker 60. Further, the bell signal generator 38 is operated by the voltage source, root mean square (rms) 75 volts (V), that is being supplied by the telephone line. The input voltage is rectified and regulated to produce an operating voltage used in the bell signal generator 38. Preferably, the bell signal generator 38 is formed into an application specific integrated circuit (ASIC) incorporating a controller and a bell signal generation circuit which can detect potentials of the ring signal and producing a command driving the bell signal generation circuit. Also, the ring signal may be detected by a common ring detector used in normal telephone systems. The operation of the bell signal generator 38 is shown in the flow chart of FIG. 4.

Figure 4:
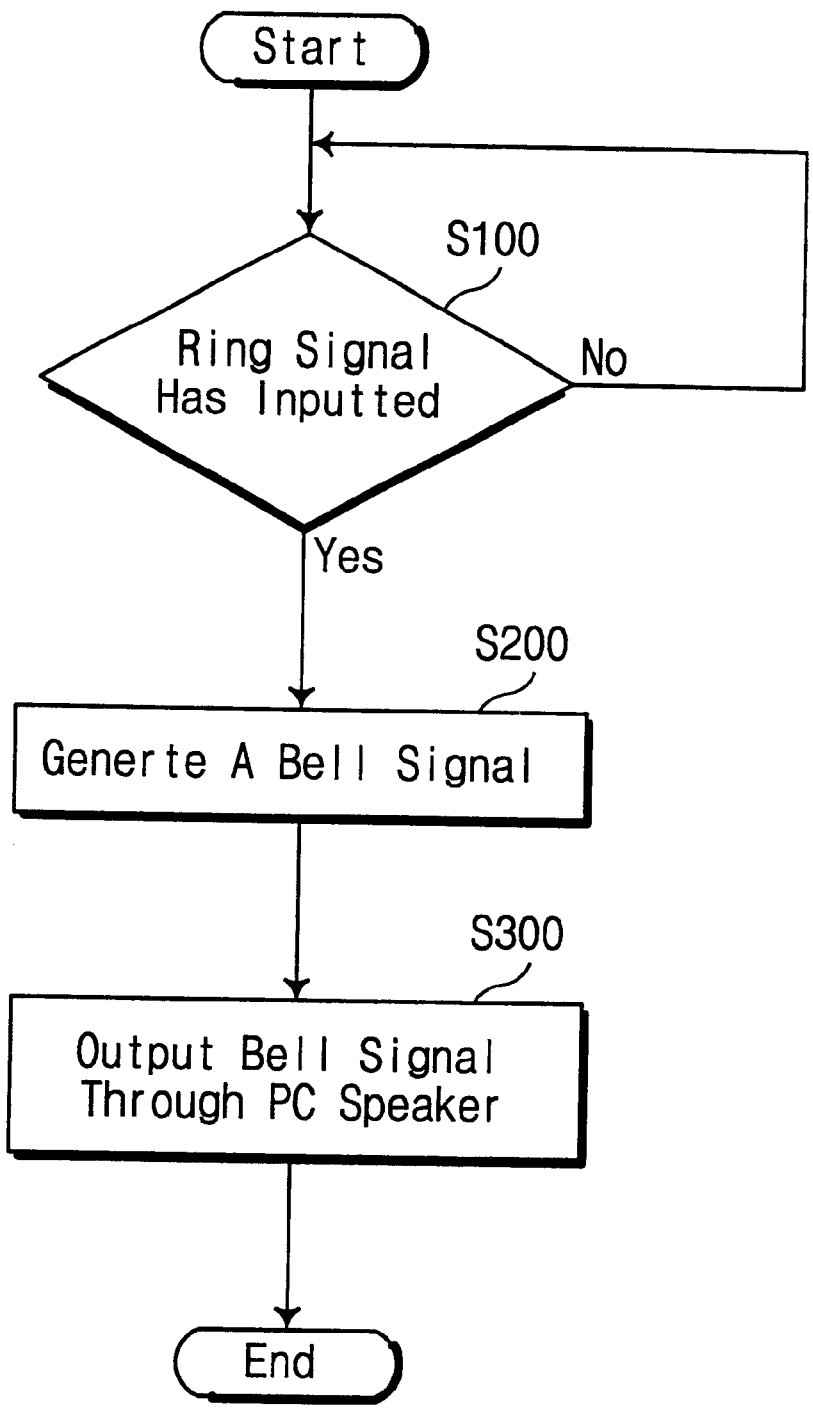
FIG. 4 is a flow diagram for illustrating operation of the telephone bell signal generator of FIG. 3, in accordance with the principles of the present invention.

Turn now to FIG. 4, which shows a flow diagram for illustrating operation of the telephone bell signal generator of FIG. 3, in accordance with the principles of the present invention. At step 100, a determination is made as to whether a ring signal has inputted. If a ring signal is detected by the bell signal generator 38, the bell signal generator 38 produces a command to drive a common bell signal generation circuit at step 200. Once the bell signal generation circuit in the bell signal generator 38 is driven, a bell signal is generated and outputted to the speaker 60 at step 300. With this, it is possible for the computer user to hear the bell signal representing that a telephone call has been received by the modem.

In contrast, when the computer system is in the active state, the modem is also operating and the relay drive voltage $V_{cc}$ is supplied to the relay switch 37, allowing its switches to cut off the telephone lines directed to the bell signal generator 38. Thus the bell signal generator 38 becomes disabled. In this case, if a telephone ring signal is received by the modem 70, the ring detector of the modem detects the ring signal sent to the modem controller. The hook switch is turned on and the modem is placed in the active state. The ring signal may be converted into a bell signal when an appropriate terminal program is running in the computer system.

Further, when the PC speaker 60 sounds the telephone bell signal, the computer user may receive the call by connecting a telephone set with the telephone modular jack of the modem 70. Alternatively, the computer user may activate the computer system and a terminal program to receive that call.

The above-noted relay switch 37 and the bell signal generator 38 may be configured either in the modem card 70 or in the computer main board 22. Also, the speaker 60 may use the speaker normally installed in the modem card 70.

The unit 60 depicted in FIG. 3 can correspond to a speaker unit outputting audible signals in response to a bell signal that is received along the telephone line. Alternatively, the unit 60 depicted in FIG. 3 can correspond to a light emitting unit outputting light signals in response to a bell signal that is received along the telephone line. An additional option is for the unit 60 depicted in FIG. 3 to correspond to a light outputting unit and a speaker unit that outputs light signals and audible signals. The light signals can be output by a light emitting diode (LED), an incandescent bulb, a laser, a fluorescent tube, or any other type of light producing unit. The light signals produced in response to the bell signal can correspond to a flashing sequence in which the light source is periodically turned on and off, or the light signals can correspond to a constant on state where light is constantly emitted, or a combination of different lighting patterns. Light having different colors can be emitted. Visible light can be emitted. Infrared light can be emitted. The audible signals produced in response to the bell signal can correspond to one or more of a variety of ringing tones or signaling tones to alert a user that an incoming call exists. A combination of quiet and loud sounds can be emitted from the unit 60.

As is apparent from the foregoing description, the computer system according to this invention may detect the telephone ring signal and sound a bell signal even if the computer as well as the modem is not in the active state.

While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departing from the spirit or scope of the applicant's general inventive concept.

What is claimed is:

1. An apparatus, comprising:
   a computer system processing information;
   a telephone cable having a first end and a second end, said cable conveying data between said first and second ends, said first end being coupled to a central office;
   a modem outputting a voltage signal according to an active state of said modem, said modem being coupled to said computer system and being coupled directly to said second end of said telephone cable;
   a generator coupled to a junction between said modem and said telephone cable, said generator producing a bell signal in response to a ring signal received from said telephone cable, said ring signal corresponding to an incoming call, said bell signal informing an operator of existence of said incoming call; and
   a switch connected between said generator and said junction between said modem and said telephone cable, said switch switching on to connect said telephone cable to said generator when said modem is in an inactive state, said switch switching off to disconnect said telephone cable from said generator when said modem is in an active state, and said switch performing said switching on and said switching off in response to said voltage signal received from said modem.

2. The apparatus of claim 1, further comprising a speaker unit coupled to said generator, said speaker unit producing an audible signal corresponding to said bell signal.

3. The apparatus of claim 1, further comprising a light emitter coupled to said generator, said light emitter producing a visible light signal corresponding to said bell signal.

4. The apparatus of claim 1, further comprising a light emitter and a speaker unit coupled to said generator, said light emitter producing a visible light signal corresponding to said bell signal, said speaker unit producing an audible signal corresponding to said bell signal.

5. The apparatus of claim 1, said generator and said switch being incorporated into said modem.

6. The apparatus of claim 1, said generator and said switch being incorporated into said computer system.

7. The apparatus of claim 1, said computer system comprising a main board.

8. The apparatus of claim 1, said generator and said switch being incorporated into said main board.

9. An apparatus, comprising:
   a computer system processing user information including varying visual information;
   a modem outputting a voltage signal in accordance with an operating state of said modem, said modem being coupled to said computer system and being coupled directly to a telephone cable;
   a generator coupled to a junction between said modem and said telephone cable, said generator producing a bell signal in response to a ring signal received from said telephone cable, said ring signal corresponding to an incoming call, said bell signal informing an operator of existence of said incoming call; and
   a switch connected between said generator and said junction between said modem and said telephone cable, said switch connecting said telephone cable to said generator and not connecting said telephone cable to said generator in response to said voltage signal received from said modem.

10. The apparatus of claim 9, said computer system further comprising a speaker unit outputting audible signals.

11. The apparatus of claim 10, said speaker unit of said computer system outputting audible signals in response to said ring signal when said modem and said computer system are in an active operating state.

12. The apparatus of claim 10, said speaker unit of said computer system not outputting audible signals in response to said ring signal when said modem and said computer system are not in an active operating state.

13. The apparatus of claim 9, said bell signal being produced by said generator when said modem and said computer system are not in an active operating state.

14. The apparatus of claim 9, said bell signal not being produced by said generator when said modem and said computer system are in an active operating state.

15. The apparatus of claim 9, said computer system further comprising a display unit conveying said varying visual information to a user, wherein said display unit is selected from a group consisting of a cathode ray tube, a liquid crystal display, a gas-plasma display, a light emitting diode display, an electro-luminescent display, and a field emission display.

16. An apparatus, comprising:
   a modem outputting a voltage signal in accordance with an operating state of said modem, said modem being coupled directly to a telephone cable;
   a generator coupled to a junction between said modem and said telephone cable, said generator producing a bell signal in response to a ring signal received from said telephone cable, said ring signal corresponding to an incoming telephone call; and
   a switch connected between said generator and said junction between said modem and said telephone cable, said switch connecting said telephone cable to said generator so as to enable said generator to receive said ring signal, and not connecting said telephone cable to said generator in response to said voltage signal received from said modem so as to prevent said generator from receiving said ring signal.

17. The apparatus of claim 16, further comprising a speaker unit coupled to said generator, said speaker unit producing an audible signal corresponding to said bell signal.

18. The apparatus of claim 16, said generator and said switch being incorporated into said modem.

19. The apparatus of claim 16, further comprising a computer system processing information and being coupled to said modem, said generator and said switch being incorporated into said computer system.

20. The apparatus of claim 16, further comprising a main board, said generator and said switch being incorporated into said main board.

* * * * *